United States Patent
Peinemann et al.

(10) Patent No.: US 6,533,665 B2
(45) Date of Patent: Mar. 18, 2003

(54) TORSION DAMPING MECHANISM WITH AUXILIARY MASS

(75) Inventors: Bernd Peinemann, Niederwerrn (DE); Jürgen Weth, Niederwerrn (DE); Cora Carlson, Hambach (DE); Paul Kraus, Niederwerrn (DE); Reinhard Feldhaus, Poppenhausen (DE); Hartmut Bach, Schweinfurt (DE); Benedikt Schauder, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/972,058

(22) Filed: Oct. 5, 2001

(65) Prior Publication Data

US 2002/0049090 A1 Apr. 25, 2002

(30) Foreign Application Priority Data

Oct. 25, 2000 (DE) .......................... 100 52 784

(51) Int. Cl.[7] .............................. F16D 3/14; F16F 15/12
(52) U.S. Cl. ........................ 464/68; 192/30 V; 74/574
(58) Field of Search ..................... 74/574; 192/30 V, 192/212; 464/68

(56) References Cited

U.S. PATENT DOCUMENTS

| 4,813,295 A | * | 3/1989 | Drexl et al. ................. 74/572 |
| 4,842,116 A | * | 6/1989 | Fukushima .............. 192/214.1 |
| 5,168,971 A | * | 12/1992 | Kovac ....................... 192/30 V |
| 5,499,703 A | * | 3/1996 | Kii et al. ................ 192/70.11 |
| 5,836,217 A | * | 11/1998 | Sudau et al. ................... 74/574 |
| 6,068,098 A | * | 5/2000 | Yamamoto ............... 192/30 V |
| 6,106,430 A | * | 8/2000 | Peinemann ................. 475/346 |

* cited by examiner

Primary Examiner—Lynne H. Browne
Assistant Examiner—Kenn Thompson
(74) Attorney, Agent, or Firm—Cohen, Pontani, Lieberman & Pavane

(57) ABSTRACT

A torsion damping mechanism with a torsion damper with an input side and an output side, which are connected elastically to each other by spring-type stored-energy elements, and with an auxiliary mass which can rotate coaxially to the torsion damper. A combination bearing has a first bearing section for supporting the input side and the output side against each other, and a second bearing section for supporting the auxiliary mass.

18 Claims, 2 Drawing Sheets

TORSION DAMPING MECHANISM WITH AUXILIARY MASS

BACKGROUND OF THE INVENTION

1. Field of the Invention

The present invention pertains to a torsion damping mechanism with frictionally connected auxiliary mass.

2. Description of the Related Art

Torsion damping mechanisms are used to reduce variations or peaks in the torque of a drive unit and thus to give the drive shaft behind the torsion damping mechanism a more uniform torque curve. Torsion damping mechanisms of this type are used in clutch mechanisms, for example, and in dual-mass flywheels. A torsion damping mechanism consists of an input area, usually disk-like in shape, on which torque is exerted via the peripheral areas, and an output area, also usually disk-like in shape. In the case of dual-mass flywheels, the output side and the input side are each provided with a flywheel, which is connected to the disk-shaped area such as a hub disk. The flywheel on the output side is usually connected to a downline clutch mechanism. In the case of pure clutch mechanisms, the disk-shaped output area is connected to a hub, which can drive an output drive axle. The disk usually mounted on the output side is referred to as the hub disk, and it is usually enclosed on both sides by side elements. In the case of dual-mass flywheels, this hub disk would be enclosed, for example, by a flywheel on one side and by a cover plate connected to it on the other side. The actual transmission of the torque between the output side and the input side takes place between the side elements on the input side and the hub disk on the output side. The two elements are connected elastically to each other by spring-type stored-energy elements. Upon rotation of the side elements, special projections on these elements exert force on the spring elements, which transmit the force in turn to certain areas of the hub disk located at the other end of the spring devices. Thus the side elements and the hub disk rotate around a common rotational axis. Fluctuations in the torque, which are transmitted from the input side drive to the cover plates, are filtered out to a greater or lesser extent by the spring-type stored-energy elements, so that the torque has a smoother curve at the output-side hub disk.

The torsional vibration system in a clutch mechanism, for example, or in a dual-mass flywheel can be described with respect to its critical resonance speed $n_k$ as follows:

$$n_k = SQRT((1/J_1 + 1/J_2) * c * K) * 30/(\pi * Z)$$

where:

$J_1$ and $J_2$ are the inertias of the primary and secondary side;

c is the stiffness of the spring(s);

K is a correction factor with K=1 if c is given in Nm/rad or with K=180/$\pi$ if c is given in Nm/degree; and Z is the number of out-of-round events (such as ignitions in an internal combustion engine) per revolution of a drive shaft on the input side.

A disconnection can be achieved only above this rotational speed (starting at $SQRT(2) \times n_k$ as a guideline value). In the case of the dual-mass flywheel, the two inertias are approximately the same. Thus the term in parentheses reaches a minimum. In the case of a clutch disk, $J_1$ can have a value of up to $100 \times J_2$. Thus the inertia $J_2$ represents an essential "lever" by which the natural frequency of a torsional damping system with a clutch disk can be lowered.

The change in the critical speed obtained by shifting the moments of inertia of the term in parentheses, including the root, from the primary to the secondary side is shown in FIG. 7. Point A characterizes here the typical ratio for a dual-mass flywheel, which can be, for example, about 60:40, whereas point B shows the ratio for a typical clutch disk. As can be seen, in the case of the dual-mass flywheel, changes will have hardly any effect because of the very wide minimum. In the case of a clutch disk, however, the resonance point of the system can be changed significantly.

A further improvement in the torque behavior can be obtained by connecting an auxiliary mass (usually by way of a damping element) to the input or to the output side of a torsion damper.

As a result, the mass moment of inertia (MMI) of the output side or of the input side is greatly increased, so that at least one natural frequency of the total system is lowered and the so-called supercritical speed range of the drive is significantly increased. It is especially favorable to increase the mass moment of inertia on the output side of a torsion damping mechanism, because the mass moment of inertia is very small here in comparison to the mass moment of inertia on the input side, which means that even a very small amount of additional mass brings about a very sharp increase, in relative terms, in the mass moment of inertia on the output side. The auxiliary mass is preferably connected by way of a damping element. A damping element is preferred which is designed for dry friction, although viscous fluid damping or some other type of damping principle such as magnetic field damping or piezoelectric element damping could also be imagined. The effective friction between the auxiliary mass and the output or the input side can thus be set to any desired value within a wide range.

When peaks which exceed the preadjusted frictional moment now occur in the torque from the input side, e.g., a drive such as an engine, or from the output side, such as a transmission, the auxiliary mass slips, as a result of which energy is dissipated. In this way, the torque peaks in a drive train are capped, and thus the rotational irregularities are reduced.

A torsion damping mechanism can be divided into an input side (primary side) and an output side (secondary side). The input side comprises all the elements of the torsion damping mechanism up as far as the spring-type stored-energy elements, on which an external drive force acts. The output side comprises all the elements which are located on the other force-transmitting side of the spring elements and which transmit the drive force further onward via a flywheel, for example, to a clutch mechanism. As a rule, the hub disk is one of the output elements, whereas the side elements belong to the input side. It is fundamentally possible, however, to reverse the arrangement of these elements, so that the hub disk belongs to the input side, a possibility which is also to be included within the scope of the invention.

An area of application in which torsion damping mechanisms are used includes dual-mass flywheels. These are flywheels which are connected to drives which run irregularly such as internal combustion engines to make them run more smoothly; they are usually installed upline of the clutch. Dual-mass flywheels usually consist of two coaxially aligned flywheels, which are connected to each other by a torsion damper. The input side and the output side of dual-mass flywheels are usually connected by a bearing, so that one side can rotate relative to the other side. The bearing is usually oriented radially and is connected to the two sides by means of projections, areas bent into the shape of a crank, or hub-like formations on the input side or output side.

In a clutch mechanism, the clutch disk is connected to the cover plates on each side of the torsion damper (or to the hub disk). In the case of conventional dual-mass flywheels, however, one of the flywheels takes the place of one of the cover plates. The cover plate located on the other side of the hub disk has a function similar to that of the second cover plate in a clutch mechanism, in that it closes off the entire mechanism, especially the torsion springs. In dual-mass flywheels, this cover plate can also have an additional function, namely, to serve as a sealing element for so-called "wet-running" dual-mass flywheels.

In dual-mass flywheel arrangements, the hub disk is connected by appropriate fastening elements such as bolts to the second flywheel.

In many designs, one of the two flywheels of the dual-mass flywheel serves simultaneously as the flywheel of a clutch mechanism, which is connected downline from the dual-mass flywheel.

An essential cost factor in torsion damping mechanisms with auxiliary mass is the cost of the bearing for the auxiliary mass. Previously known added-mass flywheels are designed so that they have a radial bearing which is attached at some suitable point to the torsion damping mechanism, such as to one of the flywheels, for which purpose these flywheels must be specially designed. The bearing could also be attached to the cover plate or possibly to an output hub, if one is present. The shape of the elements in question can be complicated, and the production and installation of an additional bearing increases the cost of the overall torsion damping mechanism.

SUMMARY OF THE INVENTION

The present invention is therefore based on the task of providing a torsion damping mechanism with auxiliary mass which minimizes the additional cost of the radial bearing for the auxiliary mass.

This task is accomplished by the provision of a torsion damping mechanism having an auxiliary mass which can rotate coaxially to the torsion damper, and a combination bearing having a first learning section supporting the input side against the output side, and a second bearing section supporting the auxiliary mass.

The idea on which the invention is based is to combine the bearing for the auxiliary mass and the bearing for the torsion damper, i.e., the bearing which supports the input side and the output side radially with respect to each other, into a single bearing.

The invention therefore pertains to a torsion damping mechanism with a torsion damper with an input side and an output side, which are connected to each other elastically by spring-type stored-energy elements; with an auxiliary mass, which can rotate coaxially to the torsion damper; and with a combination bearing, which has simultaneously a first bearing area for supporting the input side and the output side against each other and a second bearing area for supporting the auxiliary mass.

The auxiliary mass can be connected to the torsion damper by means of a damping area to achieve a damping effect. This damping area can be a friction area, for example, and can be frictionally connected to the auxiliary mass.

The damping element is preferably designed for dry friction. It is also possible to realize viscous damping with fluids or to use some other type of damping principle. The effective frictional moment between the auxiliary mass and the torsion damping mechanism can thus be adjusted to any desired value within a wide range.

The influence of an elasticity provided in series with the coulomb friction between the auxiliary mass the torsion damper is preferably kept small in this case, in that the elasticity preferably has a value of at least 100 Nm/degree. In addition, the moment introduced into the auxiliary mass corresponds essentially to the frictional moment acting on the friction area; that is, the presence of elasticity in parallel with the friction between the torsion damper and the auxiliary mass is almost completely excluded.

In addition, an elastic element can be provided between the torsion damping mechanism and the auxiliary mass to press the auxiliary mass against the friction area. This elastic material makes it possible to adjust the frictional action more easily, and it also keeps the friction constant in the event of wear or changes in the operating conditions.

In a concrete embodiment of the present invention, the torsion damper can have an arrangement of side elements with a hub disk between them, where the combination bearing is located radially on an area of the side elements. The first bearing area supports the hub disk, and the second bearing area supports the auxiliary mass, so that the auxiliary mass and the hub disk are supported jointly by the combination bearing.

There are various types of standard bearing available to the expert to arrive at a concrete implementation of the combination bearing. For example, the combination bearing can be a plain bearing.

The torsion damping mechanism can also have additional elements, if desired, such as a flywheel or a toothed wheel in addition to the torsion damper itself. In the case of dual-mass flywheels, one of the flywheels is a component of the side parts and can in this case also be considered a part of the torsion damper.

The torsion damping mechanism can also have a flywheel arrangement, and the auxiliary mass can be connected frictionally to this flywheel arrangement.

The flywheel arrangement can be mounted on the hub disk. The torsion damping mechanism can also have side elements with another flywheel, this being the case, for example, when the torsion damping mechanism according to the invention is used in a dual-mass flywheel.

The flywheel arrangement preferably has a first flywheel, which is mounted on a hub disk, and a second flywheel, which forms at least part of the side elements, where the auxiliary mass is supported radially on the second flywheel and is located essentially radially inside the first flywheel. The auxiliary mass is connected frictionally to the first flywheel and an elastic element holds the auxiliary mass under axial tension between the first flywheel and a support element mounted on the first flywheel, with which two components the auxiliary mass is in frictional contact.

The description the various aspects of the present invention presented above does not include an explanation of how the auxiliary mass can rotate around the combination bearing or how its friction area rotates. One possibility is that the auxiliary mass can rotate freely; that is, it is possible in principle for the auxiliary mass to rotate around a complete 360°. For certain embodiments, however, it can also be preferable to limit the rotation of the auxiliary mass around the combination bearing tangentially by stops, with the result that the auxiliary mass cannot rotate around a full 360°. "Tangential" is understood here to mean that points on a plane of rotation which are adjacent to each other in the tangential direction can be converted into each other by rotation. A tangential movement is therefore the movement of a point in a rotational direction which causes no change in its radial distance.

The stops in this case can have at least one stop element, a first area of which is mounted on the torsion damping mechanism, whereas a second area engages with recesses in the auxiliary mass. The tangential ends of the recesses thus limit the relative movement of the stop in the recess. What is present here is therefore a system of grooves, into which a projection can engage but which can move only within the boundaries of the groove.

The first area of the minimum of one stop can be mounted on a flywheel. The auxiliary mass can be frictionally connected to the input side or to the output side, and the first area of the minimum of one stop can be located on the side to which the auxiliary mass is frictionally connected. If the connection of the auxiliary mass and the attachment of the stops are on the same side of the torsion damping mechanism, the movement of the auxiliary mass is limited. As a result, the auxiliary mass cannot reach high differential rotational speeds relative to the connected side, so that the amount of energy dissipated by the relative motion is reduced and wear is minimized.

The auxiliary mass can also be frictionally connected to the input side or to the output side, and the first area of the minimum of one stop can be located on the side to which the auxiliary mass is not frictionally connected. If the connection of the auxiliary mass and the attachment of the stops are on different sides of the torsion damping mechanism, the auxiliary mass acts like a carried-along friction ring subject to the mass moment of inertia.

In addition to the advantage described above, the additional carry-along friction between the input side and the output side provides a further improvement in the resonance behavior in particular. Thus the first area of the minimum of one stop can be located on the flywheel to which the auxiliary mass is not frictionally connected, or the first area of the minimum of one stop can be located on the same flywheel as that to which the auxiliary mass is connected.

The torsion damping mechanisms according to the invention described so far can be used in particular as part of a dual-mass flywheel.

To lower costs, the radial bearing for the auxiliary mass is located as far as possible radially toward the inside; in particular, it should be radially inside the crankshaft bolts. For this purpose, a drive shaft with a plurality of fastening elements arranged in a circle concentric to the rotational axis can be attached on the input side of the torsion damping mechanism according to the invention. It is preferred in this case for the combination bearing to be located radially inside the radius of the fastening elements.

The action of the auxiliary mass depends on the ratio of the mass moments of inertia between the auxiliary mass and the side of the torsion damping mechanism to which the auxiliary mass is connected by friction. In particular, it is preferred that the ratio of the mass moments of inertia between the auxiliary mass and the part of the torsion damping mechanism to which the auxiliary mass is connected be at least 0.1.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

There is a wide variety of ways in which the arrangement of the various elements can be concretely realized. The auxiliary mass can exert its friction either on the input side or on the output side of a torsion damping mechanism. For example, the friction can be exerted on an input flywheel, on an output flywheel, on the side elements and cover plates of the input side or output side, or on a hub disk.

If an elastic element such as a disk spring is used to produce a defined pressure on the friction surface, this elastic element can also be located on any one of the various parts of the torsion damping mechanism according to the invention as long as this spring, in combination with the frictional connection of the auxiliary mass, can exert pressure on the friction surface.

Finally, the radial support and the concrete shape of the auxiliary mass can also be varied within wide limits. Thus, the auxiliary mass can be supported on the cover plate of a dual-mass flywheel; on the output flywheel of the dual-mass flywheel; or on the input flywheel of a dual mass flywheel, where this input flywheel can also be specially designed with projections, flanges, areas bent onto the shape of a crank, hub-like elevations, etc., which allow the attachment of a radial bearing. The auxiliary mass can also be located between the torsion damper and the flywheel (especially the output flywheel) or radially inside this output flywheel.

It is preferable for the damping element to be designed for dry friction. The effective frictional moment between the auxiliary mass and the input side or the output side can thus be adjusted to any desired value within a wide range.

Figure 1:
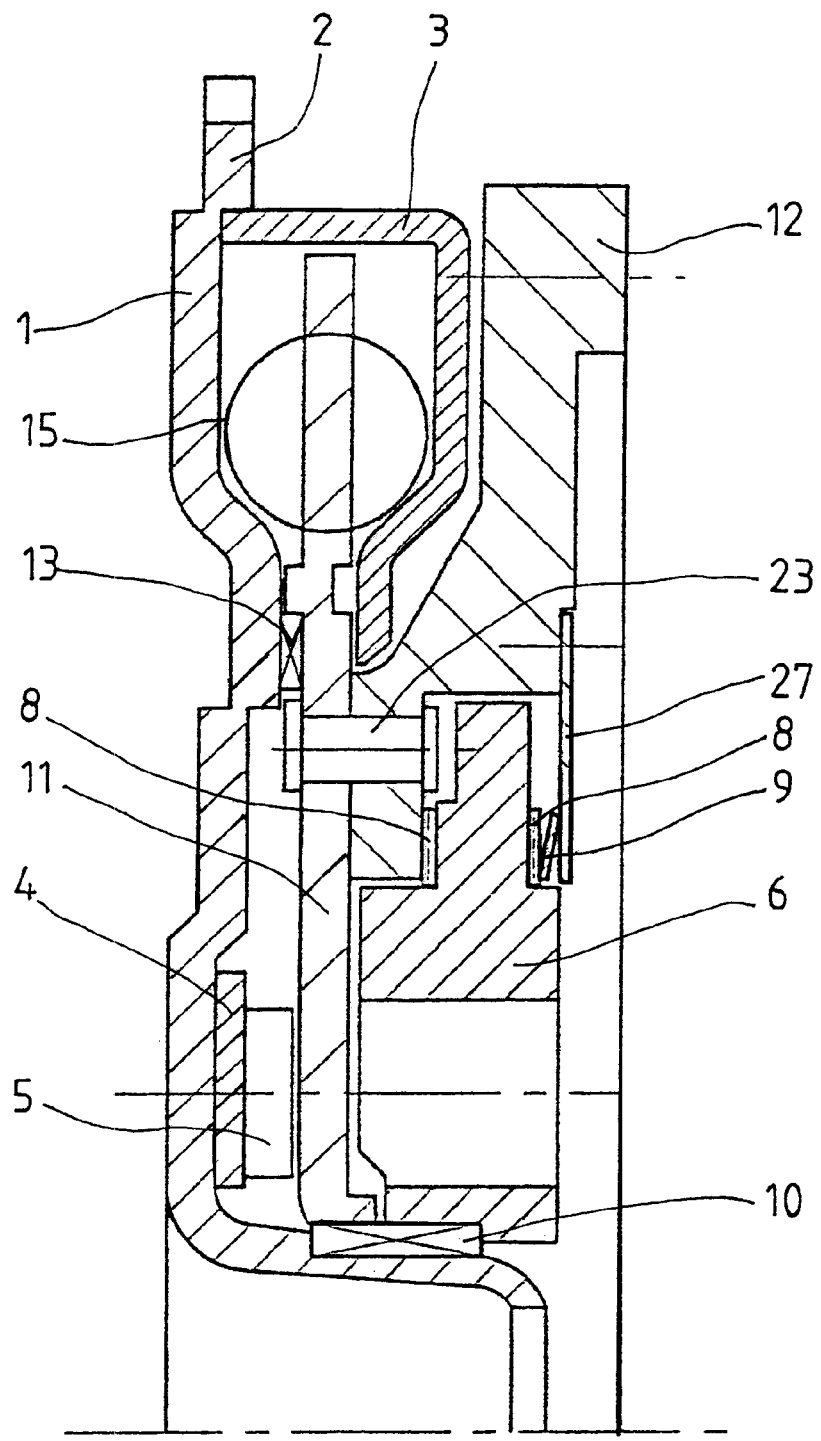
FIG. 1 shows a first embodiment of the torsion damping mechanism according to the present invention.

FIG. 1 shows a first exemplary embodiment of a torsion damping mechanism according to the present invention for use in a dual-mass flywheel. Shown in FIG. 1 is dual-mass flywheel, which, on the input side, comprises, for example, a primary flywheel 1, a ring gear 2 (so that the flywheel can be driven by a starter motor when the engine connected to it is started), a cover plate 3, and a shim plate 4; on the output side, it comprises a secondary flywheel 12 and a hub disk 11, which is also referred to simply as the "hub". The hub disk 11 and the secondary flywheel 12 are attached tightly to each other by circularly arranged bolts 23.

The force is transmitted between the input side and the output side by way of appropriately formed elements, which are supported on both sides of the springs 15 and thus transfer the torque in an elastic manner. The output side is supported on the input side, for which purpose an axial bearing 13 is used. The axial support by means of the axial bearing 13 is accomplished with the help of, for example, a buffer disk, installed between the primary flywheel and the hub disk.

If the dual-mass flywheel is being used in a clutch mechanism, the secondary flywheel can simultaneously be the input flywheel of the clutch mechanism, so that the clutch disk and the pressure plate, neither of which is shown, can then belong to the output side. A clutch disk of this type can also have an input damper.

According to the invention, an auxiliary mass 6 is provided, which, in the present exemplary embodiment, is connected to the output side by dry friction.

The radially mounted combination bearing 10 serves to support both the hub disk 11 and the auxiliary mass 6. The auxiliary mass 6 in this embodiment is supported radially on the inside on the primary flywheel 1 by the combination bearing 10. A disk spring 9 holds the auxiliary mass 6 under axial tension between the secondary flywheel 12 and a support element 27 mounted on the secondary flywheel 12 via a first friction ring 8 on one side and a second friction ring 8 on the other side.

Figure 2:
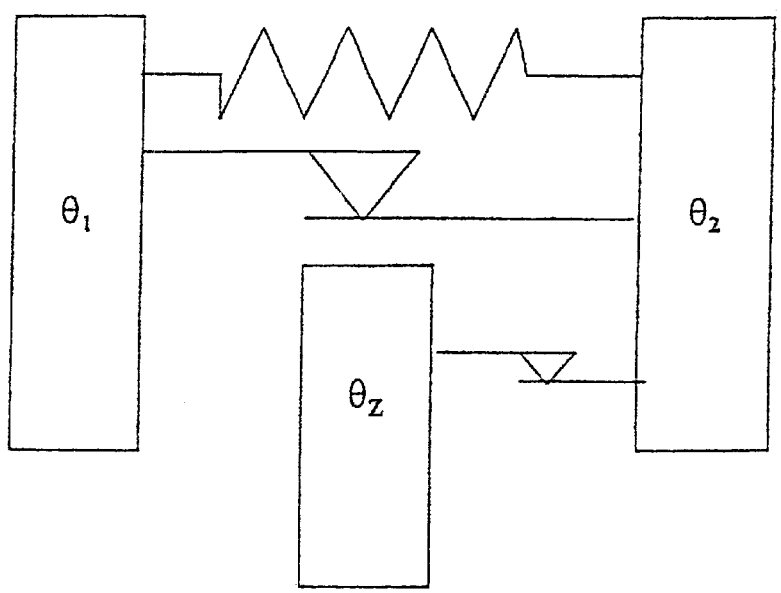
FIG. 2 is a general connection diagram, which shows how the auxiliary mass is connected to the output side of the torsion damping mechanism.
Figure 3:
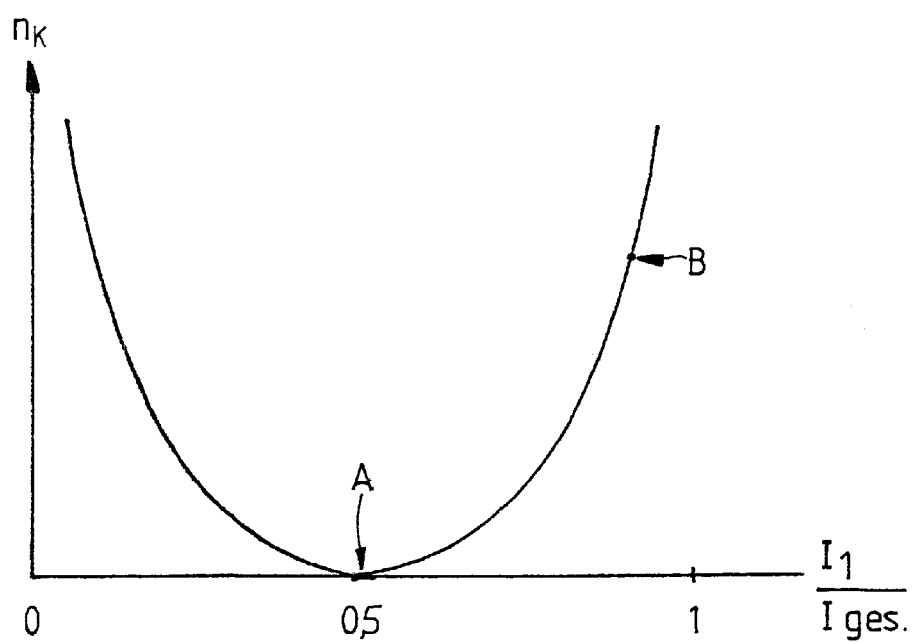
FIG. 3 shows a graph of the relationship between the inertias of a torsion damping system and the critical resonance speed.

FIG. 2 shows the way in which the various parts are connected to each other again in schematic fashion. It can be seen that the mass moment of inertia $\Theta_1$ of the input side is transmitted to an output side mass moment of inertia $\Theta_2$ by both elastic and frictional means, the friction component of the transmission being realized, for example, by a conventional friction ring. The mass moment of inertia $\Theta_z$ of the auxiliary mass is connected here by friction to the output side mass moment of inertia $\Theta_2$.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A torsion damping mechanism comprising
an input side to which torque is applied,
an output side,
spring-type stored energy elements connecting said input side and said output side for rotation in common about a rotational axis,
an auxiliary mass which can rotate about said axis, and
a combination bearing having a first bearing section supporting said input side against said output side, and a second bearing section supporting said auxiliary mass.

2. A torsion damping mechanism as in claim 1 further comprising a damping area which connects said auxiliary mass to one of said input side and said output side.

3. A torsion damping mechanism as in claim 2 wherein said damping area is a friction area, said auxiliary mass being frictionally connected to said one of said input side and said output side.

4. A torsion damping mechanism as in claim 3 further comprising an elastic element between said auxiliary mass and said one of said input side and said output side, said elastic element pressing said auxiliary mass against said friction area.

5. A torsion damping mechanism as in claim 1 further comprising a hub disk arranged between said input side and said output side, said hub disk being fixed to one of said input side and said output side, said first bearing section supporting said hub disk against the other of said input side and said output side.

6. A torsion damping mechanism as in claim 1 wherein said combination bearing is a plain bearing.

7. A torsion damping mechanism as in claim 1 comprising a flywheel, said flywheel comprising one of said input side and said output side, said auxiliary mass being frictionally connected to said flywheel.

8. A torsion damping mechanism as in claim 1 further comprising a hub disk fixed to said flywheel.

9. A torsion damping mechanism as in claim 8 further comprising an additional flywheel, said additional flywheel comprising the other of said input side and said output side.

10. A torsion damping mechanism as in claim 1 comprising a primary flywheel comprising said input side and a secondary flywheel comprising said output side, said auxiliary mass being supported radially on said primary flywheel and extending radially inside said secondary flywheel, said auxiliary mass being frictionally connected axially to said secondary flywheel, said mechanism further comprising
a hub disk on which said secondary flywheel is mounted,
a support element on said secondary flywheel, and
an elastic element between said auxiliary mass and said support element, said elastic element pressing the auxiliary mass against the secondary flywheel.

11. A torsion damping mechanism as in claim 1 further comprising stops which limit the rotation of the auxiliary mass about the combination bearing.

12. A torsion damping mechanism as in claim 11 wherein said stops comprise a stop element fixed to one of said input and output sides, said auxiliary mass having a recess in which said stop element engages, said recess having tangential ends which limit relative motion of the stop element in the recess.

13. A torsion damping mechanism as in claim 12 comprising a flywheel to which said stop element is fixed.

14. A torsion damping mechanism as in claim 12 wherein said auxiliary mass is frictionally connected to one of said input side and said output side, said stop element being fixed to the other of said input side and said output side.

15. A torsion damping mechanism as in claim 12 wherein said auxiliary mass is frictionally connected to one of said input side and said output side, said stop element being fixed to said one of said input side and said output side.

16. A torsion damping mechanism as in claim 1 comprising a primary flywheel comprising said input side and a secondary flywheel comprising said output side.

17. A torsion damping mechanism as in claim 1 further comprising a plurality of fastening elements for fastening said input side to a drive shaft, said fastening elements being arranged on a circle concentrically to said rotational axis, said combination bearing being located radially inside said circle.

18. A torsion damping mechanism as in claim 1 wherein said auxiliary mass has a mass moment of inertia and said one of said input side and said output side to which it is connected has a mass moment of inertia, said mass moment of inertia of said auxiliary mass having a ratio of at least 0.1 with respect to said mass moment of inertia of said one of said input side and said output side.

* * * * *